United States Patent [19]
Buchanan, Jr. et al.

[11] Patent Number: 5,525,878
[45] Date of Patent: Jun. 11, 1996

[54] APPARATUS AND METHOD FOR CONTROLLING AN ELECTRIC MOTOR

[75] Inventors: Harry C. Buchanan, Jr., Spring Valley; Richard E. Wainwright, Waynesville; Peter S. Zhou, Dayton, all of Ohio

[73] Assignee: ITT Automotive Electrical Systems, Inc., Auburn Hills, Mich.

[21] Appl. No.: 315,428

[22] Filed: Sep. 30, 1994

[51] Int. Cl.$^6$ ..................................................... H02P 1/04
[52] U.S. Cl. ..................... 318/443; 318/DIG. 2; 318/444
[58] Field of Search ........................... 318/562, 430–470, 318/DIG. 2, 282, 285, 293; 15/250 C, 250.17

[56] References Cited

U.S. PATENT DOCUMENTS

| | | | |
|---|---|---|---|
| 4,075,501 | 2/1978 | Kondo | 307/41 |
| 4,091,317 | 5/1978 | Roszyk et al. | 318/369 |
| 4,314,186 | 2/1982 | Gille et al. | 318/434 |
| 4,320,329 | 3/1982 | Gille et al. | 318/443 |
| 4,355,270 | 10/1982 | Cook et al. | 318/443 |
| 4,588,935 | 5/1986 | Kaneiwa et al. | 318/483 |
| 4,611,154 | 9/1986 | Lambropoulos et al. | 318/490 |
| 4,663,575 | 5/1987 | Juzswik et al. | 318/444 |
| 4,689,535 | 8/1987 | Tsunoda et al. | 318/443 |
| 4,961,033 | 10/1990 | Hirota | 318/560 |
| 5,030,899 | 7/1991 | Nishibe et al. | 318/444 |
| 5,086,260 | 2/1992 | Ito | 318/266 |
| 5,235,260 | 8/1993 | Furukoshi | 318/443 |
| 5,285,138 | 2/1994 | Okada | 318/280 |
| 5,404,085 | 4/1995 | Resch et al. | 318/443 |
| 5,412,296 | 5/1995 | Chien et al. | 318/444 |

*Primary Examiner*—Paul Ip
*Attorney, Agent, or Firm*—Jacox, Meckstroth & Jenkins

[57] ABSTRACT

A feedback control circuit limits current being supplied to an electric drive motor. The motor drives a load cyclically along a path, and the load closes a switch when it passes a predetermined position. This activates a timing circuit which times out after a predetermined delay. If the load does not return to the predetermined position at the end of the prescribed delay time, then an oscillator circuit is triggered into operation to periodically terminate current flow to the motor. This provides cooling periods and enables the motor to exert repeated, temporary high torque efforts to restore normal operation.

5 Claims, 1 Drawing Sheet

APPARATUS AND METHOD FOR CONTROLLING AN ELECTRIC MOTOR

BACKGROUND OF THE INVENTION

This invention relates to the field of electric motor control and more particularly to apparatus and method for limiting high current flows associated with excessive torque conditions. The invention has particular application to a drive motor for a windshield wiper but finds utility in other motors connected for driving a load along a repeating path. In cases wherein movement of the load is temporarily blocked by an obstruction, such as ice or crusted snow on a windshield, the motor may exert excess torque in an attempt to clear the blockage. This may lead to excess current flow and consequent damage to the motor.

Contemporary windshield wiper systems require drive motors able to deliver a wide range of speeds and torques. When operating at lower speeds and higher torques the motor is generally outside its operating region of maximum efficiency. Under such operating conditions the motor easily overheats, thereby increasing armature resistance, further raising the heat and the current flow until a circuit breaker disengages or the motor burns up.

It is a principal object of this invention to limit the current flow to an electric drive motor in such a manner as to deal effectively with conditions of high torque requirements without suffering damage in the process.

SUMMARY OF THE INVENTION

This invention limits the output torque (and input current) of an electric motor to a predetermined, relatively high level which can be tolerated for repeated short periods of time. A sensing device such as a switch senses the arrival of a motor load at a predetermined position. If the load fails to arrive at the predetermined position for a predetermined period of time, then the motor driving current is repeatedly, and temporarily, interrupted.

In the preferred embodiment there is a feedback circuit which senses motor supply current flowing through a power FET and adjusts the base voltage to limit the current to the predetermined level. The position sensor, transmits a signal to a delay circuit when the motor returns its load to the predetermined position. If the motor fails to return its load to the predetermined position for the predetermined period of time, then the delay circuit enables operation of an oscillator. The oscillator periodically switches off the power FET, so the motor operates in short, reasonably powerful bursts. This enables the motor to work against a blockage without suffering permanent damage.

In application for driving a windshield wiper there is an inner wiper switch which is tripped each time the wiper arm returns to an inner wipe position. This temporarily connects a coupling capacitor to a supply voltage. The coupling capacitor discharges to ground, if the inner wiper switch is not tripped for an excessive period of time. When the coupling capacitor discharges it turns off the collector current in an NPN transistor and triggers an operational amplifier into oscillation. When the output of the operational amplifier is LO, the FET is temporarily disabled, and the motor turns off to cool down.

DESCRIPTION OF THE PREFERRED EMBODIMENT

Figure 1:
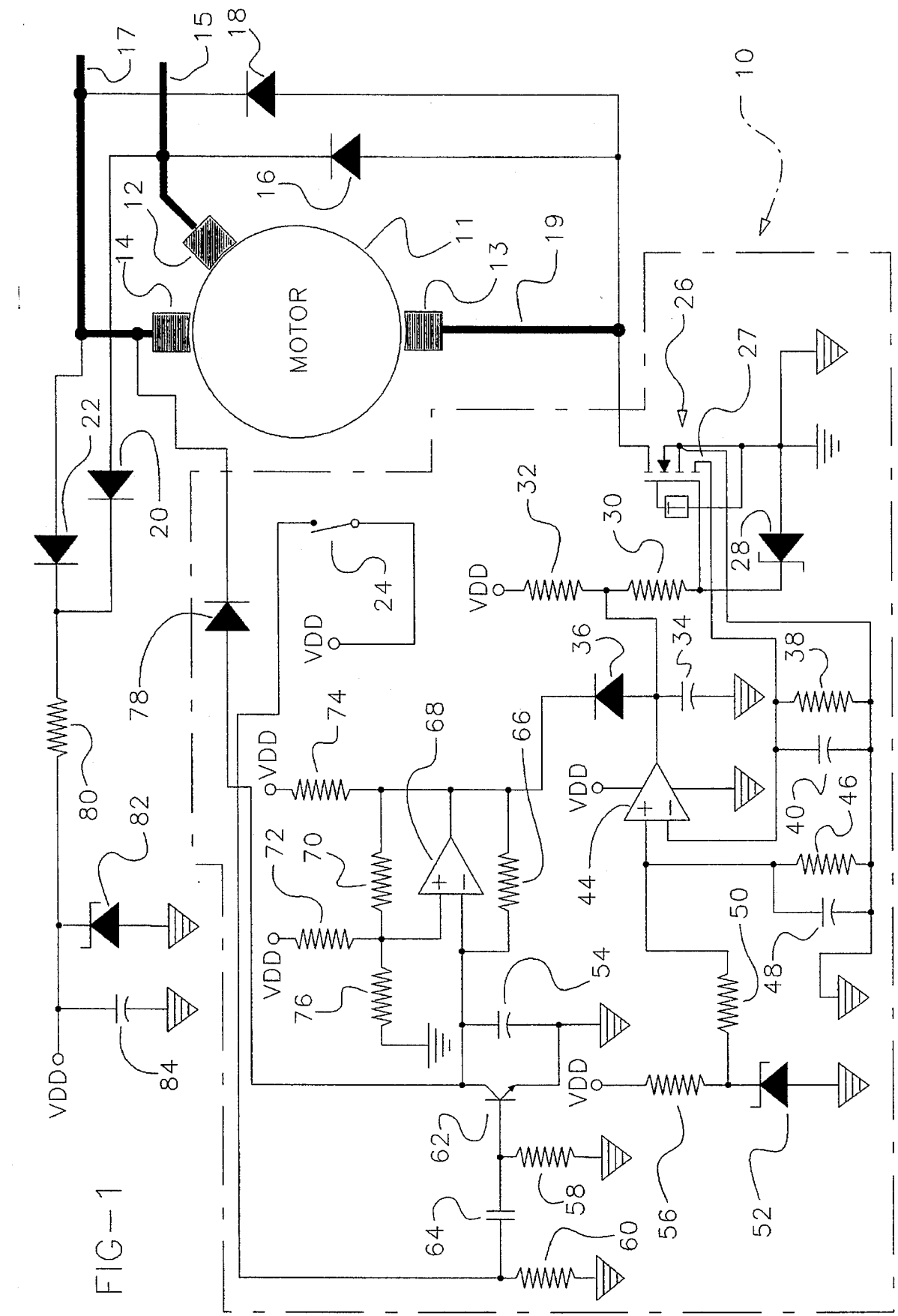
FIG. 1 is a schematic diagram of apparatus for controlling an electric motor current supply.

FIG. 1 illustrates a current control system 10 according to the present invention. As shown therein, control system 10 is controlling current flow through a windshield motor 11. Motor 11 is a conventional DC motor having a high speed brush 12, a low speed brush 14 and a common brush 13. A low speed winding (not illustrated) is excited through low speed brush 14 and operates at relatively high torque. A high speed winding (also not illustrated) is excited through high speed brush 12 and operates at somewhat lower torque. The common brush 13 provides a current return path for both windings.

Brushes 12, 14 are connected to DC power supplies (not illustrated) via power lines 15, 17 respectively. The power is switched by diodes 16, 18, 20, 22, resistor 80, Zener diode 82 and capacitor 84. Common brush 13 is connected to a power return line 19 which provides a path to ground through a temperature sensing power FET 26. FET 26 may be a BTS series FET and terminates power to motor 11 when the temperature exceeds about 150° C. FET 26 is mounted in close proximity to motor 11 and is easily able to detect an overheating condition, the usual first consequence of prolonged excess current flow.

The current flow through motor 11 also is limited in another way. A constant fraction (e.g. 1/2500) of the current flowing through FET 26 branches through sense terminal 27 and passes to ground through a resistor 38. Resistor 38 has a rather small resistance, which may be in the order of about 40 ohms. The voltage drop across resistor 38 is sensed at the inverting terminal of an operational amplifier 44. This voltage is inverted/amplified by amplifier 44 and fed back to the base of FET 26 via a voltage divider arrangement comprising resistors 30, 32. The gate/source voltage of FET 26 is clamped by Zener diode 28.

As the current through FET 26 increases, the feedback from amplifier 44 decreases, thereby limiting the current through FET 26. Zener diode 52 and resistors 46, 50, 56 provide a reference voltage for the current limit value. Low pass filtering is provided by capacitors 40, 48. The current is limited to some relatively high flow which the motor can tolerate for short periods of time. This enables the motor to generate repeated short bursts of relatively high torque for clearing obstructions.

While motor 11 is operating properly, a wiper arm (not illustrated) regularly returns to an inner wipe position and temporarily closes a normally open inner wipe switch 24. This applies a charge to capacitor 64, maintains an NPN transistor 62 in a continuously conducting condition and shorts out another capacitor 54. However, when the wiper becomes blocked, switch 24 is not tripped with sufficient regularity, and the charge on capacitor 64 leaks off to ground through resistors 58, 60. This turns off transistor 62 and causes a charge to accumulate on capacitor 54. Meanwhile motor 11 stalls and tries to draw to draw more current, which amplifier 44 will not permit it to have.

The collector of transistor 62 is connected to the inverting input of an operational amplifier 68. As long as transistor 62 is in a conducting state, the inverting input of amplifier 68 is connected to ground, and the amplifier output floats HI. This reverse biases diode 36, so that amplifier 44 is able to limit current flow through FET 26, as described above.

When motor 11 stalls or slows significantly and causes transistor 62 to stop conducting, the inverting input of amplifier 68, and the non-grounded side of capacitor 54, become connected to a positive voltage source VDD through resistors 66, 70, 72, 74. After a period of time a charge accumulates on capacitor 54, and amplifier 68 temporarily switches LO. This causes diode 36 to become conducting and drains off the feedback signal from amplifier 44. As a consequence FET 26 turns off. Capacitor 54 then begins to discharge through resistor 66. Discharging of capacitor 54 continues until the voltage at the inverting input terminal of amplifier 68 falls below the reference voltage at the non-inverting input terminal. When that happens amplifier 68 switches HI.

It is therefore seen that amplifier 68, resistors 66, 70, 72, 74, 76 and capacitor 54 comprise an oscillation circuit. So long as transistor 62 remains non-conducting, amplifier 68 produces an oscillating output which, for example may be LO for about 6 sec. and HI for about 3 sec. During the LO periods motor 11 is shut down, and during HI periods it operates at maximum torque. This provides alternating cooling and retry periods until normal operation is restored.

It will be appreciated that the above description of the invention as applied to a windshield wiper motor is merely exemplary. The invention could be applied to other reversible type motors, such as waste disposer motors or to any electric motor which encounters temporary conditions requiring a high torque output.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for controlling the flow of electric current to a motor engaged in cyclically moving a load, said apparatus comprising:

(a) current limiting means for limiting, to a predetermined level, electric current supplied to said motor;

(b) position sensing means for generating a periodic response signal indicating that said load has arrived at a predetermined position;

(c) shutdown means for temporarily and periodically terminating said electric current so as to provide cooling periods and enable said motor to exert a high torque on a temporary but repeated basis; and (d) activation means for activating said shutdown means upon failure of said position sensing means to generate said response signal for a predetermined period of time, wherein said activation means comprises: gate means connected to said shutdown means, and delay means, resettable by said response signal and connected for causing said gate means to activate said shutdown means upon failure of said response signal to occur for said predetermined period of time.

2. Apparatus according to claim 1 wherein said position sensing means comprises a switch activated temporarily upon arrival of said load at said predetermined position.

3. Apparatus for controlling the flow of electric current to a motor in driving connection with a windshield wiper, said apparatus comprising:

(a) current limiting means for limiting, to a predetermined level, electric current supplied to said motor;

(b) a switch connected for generating a periodic response signal indicating that said windshield wiper has arrived at a predetermined position;

(c) an oscillator for temporarily and periodically interrupting said electric current so as to provide cooling periods and enable said motor to exert a repeated, temporary high torque against said windshield wiper; and (d) activation means for activating said oscillator upon failure of said switch to generate said response signal for a predetermined period of time, wherein said activation means comprises a transistor having two predetermined conduction states and connected for initiating operation of said oscillator upon assumption of a selected one of said two predetermined conduction states, and a capacitor connected for charging by said response signal and operative for causing said transistor to assume said selected conduction state upon failure of said response signal to be generated for said predetermined time.

4. Apparatus according to claim 3 wherein said oscillator comprises an operational amplifier.

5. Apparatus according to claim 3 wherein said current limiting means comprises a temperature sensitive field effect transistor connected for limiting said electric current and feedback means connected for closed loop control of said limiting by said field effect transistor.

* * * * *